(12) United States Patent
Ding et al.

(10) Patent No.: US 8,141,059 B2
(45) Date of Patent: Mar. 20, 2012

(54) METHOD AND SYSTEM FOR AVOIDANCE OF SOFTWARE CONFLICT

(75) Inventors: Yong Ding, East Lansing, MI (US); Xiao Bing Guo, Beijing (CN); Hui Su, Beijing (CN); Zhepeng Wang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1488 days.

(21) Appl. No.: 11/615,898

(22) Filed: Dec. 22, 2006

(65) Prior Publication Data
US 2007/0180441 A1    Aug. 2, 2007

(30) Foreign Application Priority Data
Dec. 23, 2005    (CN) .......................... 2005 1 0137085

(51) Int. Cl.
*G06F 9/44*    (2006.01)
*G06F 9/45*    (2006.01)

(52) U.S. Cl. ........ 717/133; 717/124; 717/126; 717/127; 717/140; 717/143; 717/144; 717/163; 717/174

(58) Field of Classification Search ........................ None
See application file for complete search history.

(56) References Cited

U.S. PATENT DOCUMENTS

| 6,397,378 B1 | 5/2002 | Grey et al. ..................... 717/175 |
| 2005/0010895 A1* | 1/2005 | Reddappagari ............... 717/106 |
| 2005/0028145 A1* | 2/2005 | Kang et al. .................... 717/128 |

* cited by examiner

*Primary Examiner* — Lewis A Bullock, Jr.
*Assistant Examiner* — Mark Gooray
(74) *Attorney, Agent, or Firm* — Ido Tuchman; William J. Stock

(57) ABSTRACT

A method/system for avoiding software conflicts, with library being divided into layer 1 to layer M and M≧1. The method including the following steps: before a program runs, prescanning calling functions of the binary executable code of the program and called functions that belong to libraries of layer 1 and are individually called by the calling functions of the binary executable code of the program, and if M>1, further prescanning calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions; if there exists at least one conflict, storing at least one piece of conflict information individually indicating the at least one conflict; and when the program calls a library directly called by the program, abandoning loading of the library if conflict information correspond to the library has been stored, or loading the library otherwise.

36 Claims, 9 Drawing Sheets

METHOD AND SYSTEM FOR AVOIDANCE OF SOFTWARE CONFLICT

CROSS-REFERENCE TO RELATED APPLICATIONS

This application claims priority under 35 U.S.C. §119 to Chinese Patent Application No. 2005-10137085.9 filed Dec. 23, 2005, the entire text of which is specifically incorporated by reference herein.

BACKGROUND OF THE INVENTION

The present invention relates to avoidance of software conflicts, and in particular, to method and system for avoidance of software conflicts.

The software conflict is one of serious problems in end users' experience of operating computers. In a software conflict, the application may report errors or become incapable of some useful functions. Even worse, some conflicts not only disable current applications, but also crash the computer, causing end users to reboot their computers. There are two major reasons for software conflicts:

(1) bugs; and (2) dll/library/platform issue. For example, due to dll/library/platform upgrades or removal, there may arise between the calling program and the called dll/library/platform such a situation that the library does not have the called function, the number of called parameters do not match that of binary executable code of the program to fulfill the call, the types of called parameters do not match those of binary executable code of the program to fulfill the call, or the types of returned parameters do not match those of binary executable code of the program to fulfill the call, i.e. mismatch of the dependency between caller and callee. Thus the user cannot perform the required information storing or processing with the computer.

The bug of reason (1) can be solved by developers through strict tests. The library dependency of reason (2) is the major concern of the present invention. As is well known, the software consists of executable files and libraries (such as, dll in Windows or lib/so/a in Linux/Unix). The library is provided by the software or platform. When the executable file runs, it will load the library into its user space, and call the library according to an address or name space. A conflict occurs when the software loads an unmatched library, especial as the library has upgraded. At this time, the software tries to call a function in the library, but its parameters or the return values have been changed or even the function has been removed from the library due to update. Then the software will terminate since the library cannot provide the correct function.

In general, the prior art adopts three methods to solve the above problem. Method (1) is to check the library version when running. If the versions are unmatched, the executable will exit to avoid crashing computer (see for example, U.S. Pat. No. 6,397,378B1 "TEST EXECUTIVE SYSTEM AND METHOD INCLUDING DISTRIBUTED TYPE STORAGE AND CONFLICT RESOLUTION"). Method (2) is to reduce the library dependency. For example, the executable file is made to use only basic functions of the library, which will not change in a long term. This approach can solve the problem perfectly, but it requires developers to re-write the source code line by line, which needs more effort and leads to a higher cost. Method (3) involves the virtual machine technology. If the software is the sole one running on the operating system, it will never lead to conflicts. So many virtual machines can be built on the computer, and only one application runs on each virtual machine. This approach is not ideal, because 1) it will lower the computer performance significantly and 2) it will defeat the original purpose of library. On the virtual machine, the library looks like a "private" one for the application, which cannot be shared by others.

BRIEF SUMMARY OF THE INVENTION

In view of the above, an aspect of the present invention is to provide a method/system for avoidance of software conflict, wherein a prescanner step/module prescans at least three types of syntax conflicts, thus more effective than method (1) of prior art which scans only versions. Since the prescanner step/module therein prescans all library functions, it saves effort and cost when compared with method (2) of prior art which scans only basic library functions. Since the prescanner step/module therein prescans all library functions, when compared with method (3) of prior art which adopts virtual machines, it brings out (1) improved storing and processing capacity of the computer and (2) sharing of libraries with other applications.

Another aspect of the present invention is to provide a method/system for avoidance of software conflict, wherein a sniffer step/module locates the library leading to crash, thus more effective than method (1) of prior art which scans only versions. Since the sniffer step/module therein monitors all library functions leading to crash, it saves effort and cost when compared with method (2) of prior art which scans only basic library functions. Since the calling sequence monitored by the sniffer step/module therein at least includes a piece of executable code, when compared with method (3) of prior art which adopts virtual machines, it brings out (1) improved storing and processing capacity of the computer and (2) sharing of libraries with other applications.

Yet another aspect of the present invention is to provide a method/system for avoidance of software conflict, which combines the above two methods/systems. On the basis of combining the above two approaches, it not only prevents software conflicts before a program runs through the prescanner step, but also monitors and records libraries that have passed the prescanning but lead to software conflicts during the actual calling, further preventing the libraries that have passed the prescanning but lead to software conflicts from causing software conflicts during the next call.

To achieve the above aspects, the present invention provides a method for avoiding software conflicts when a program calls at least one library, said at least one library being divided into layer 1 to layer M according to dependency among the at least one library, with each layer containing at least one library and M≧1, said method comprising the following steps: (a) before the program runs, prescanning calling functions of the binary executable code of the program and called functions that belong to libraries of layer 1 and are individually called by the calling functions of the binary executable code of the program, and if M>1, further prescanning calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions; (b) if there exists at least one conflict, storing at least one piece of conflict information individually indicating the at least one conflict; and (c) when there appears that the calling function calls the corresponding called function in a call sequence of the program in execution, abandoning loading of the library containing the called function if the conflict information indicating that the call conflicts has been stored, or loading the library otherwise.

According to another aspect of the present invention, there is provided a system for avoiding software conflicts when a program calls at least one library, said at least one library being divided into M layers according to the calling order, with each layer containing at least one library and $M \geq 1$, said system comprising: a prescanner module which before the program runs, prescans calling functions of the binary executable code of the program and called functions that belong to libraries of layer 1 and are individually called by the calling functions of the binary executable code of the program, and if M>1, further prescans calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions; a conflict information knowledge storage module which if there exists at least one conflict, stores at least one piece of conflict information individually indicating the at least one conflict; and a library loader module which when there appears that the calling function calls the corresponding called function in a call sequence of the program in execution, abandons loading of the library containing the called function if the conflict information indicating that the call conflicts has been stored, or loads the library otherwise.

According to another aspect of the present invention, there is provided a method for avoiding software conflicts when a program calls at least one library, said at least one library being divided into layer 1 to layer M according to calling order, with each layer containing at least one library and $M \geq 1$, said method comprising the following steps: (a) when running the binary executable code of the program, monitoring a piece of executable code currently running in a call sequence of the binary executable code of the program, said call sequence calling library functions in libraries of the M layers; (b) if it is found that the call sequence crashes when the call sequence calls functions of a library, storing conflict information on the crash; and (c) when the call sequence calls a function of the library again, abandoning loading the library if conflict information corresponding to the library has been stored, or loading the library otherwise.

According to another aspect of the present invention, there is provided a system for avoiding software conflicts when a program calls at least one library, said at least one library being divided into M layers according to the calling order, with each layer containing at least one library and $M \geq 1$, said system comprising: a sniffer module which when running the binary executable code of the program, monitors a piece of executable code currently running in a call sequence of the binary executable code of the program, said call sequence calling library functions in libraries of the M layers; a conflict information knowledge storage module which if it is found that the call sequence crashes when the call sequence calls functions of a library, stores conflict information on the crash; and a library loader module which when the call sequence calls a function of the library again, abandons loading the library if conflict information corresponding to the library has been stored, or loads the library otherwise.

DETAILED DESCRIPTION OF THE INVENTION

Figure 1:
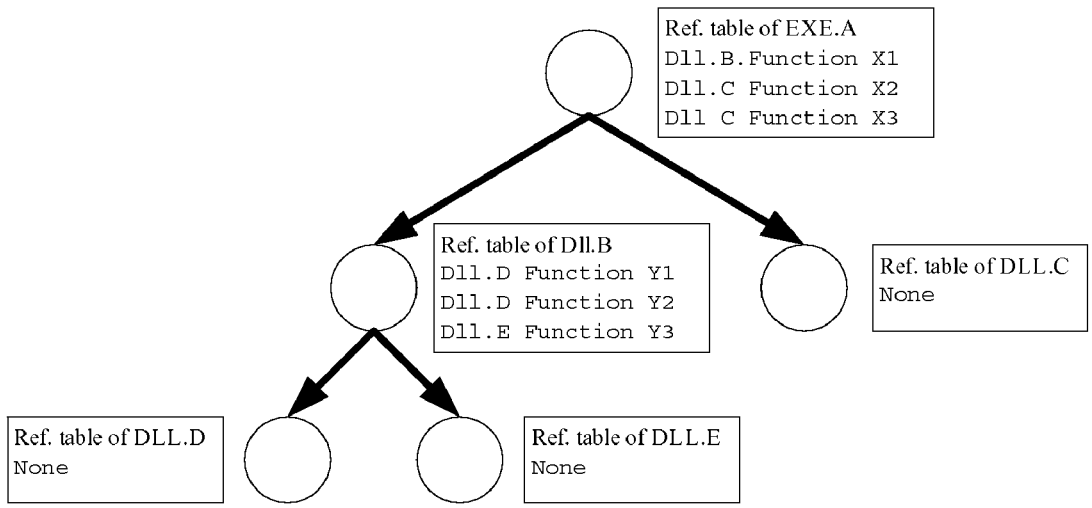
FIG. 1 shows a dependency tree generated according to the binary executable code of a program and multiple libraries it calls.

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The method/system for avoidance of software conflicts can be classified into two categories: with a prescanner step/module or with a sniffer step/module. However, those skilled in the art should know that it is also feasible to integrate the prescanner step/module and the sniffer step/module because those steps/modules detect conflicts between the software and the libraries it depends upon during different operating stages. Table 1 shows combination approaches for the above method/system.

TABLE 1

|  | Approach 1 | Approach 2 | Approach 3 |
|---|---|---|---|
| The method for software conflict avoidance according to present invention | Library installer/uninstaller step, prescanner step, software conflict avoidance step | Library installer/uninstaller step, sniffer step, software conflict avoidance step | Library installer/uninstaller step, prescanner step, sniffer step, software conflict avoidance step |
| The system for software conflict avoidance according to present invention | Library installer/uninstaller module, prescanner module, software conflict avoidance module | Library installer/uninstaller module, sniffer module, software conflict avoidance module | Library installer/uninstaller module, prescanner module, sniffer module, software conflict avoidance module |

The prescanner step/module prescans the binary executable code of a program before the program runs, thus detecting at this stage syntax conflicts that may lead to software conflicts.

The sniffer step/module monitors the binary executable code of a program when the program is running, and records the call stack. If a process crashes, the sniffer step/module will try to locate the library that leads to the crash.

Below is given a detailed description of approach 3 as a preferred embodiment of the present invention in reference to drawings. In the following description, well known steps and units in prior art relating to software conflict avoidance methods and systems will not be described in detail, in order to avoid unnecessary details obscuring the present invention.

1. Method for Avoidance of Software Conflicts

In the execution order of steps of the software conflict avoidance method, the method is analyzed into a library installer/uninstaller step, a prescanner step and/or a sniffer step, and a software conflict avoidance step.

A. Library Installer/Uninstaller Step

As is well known, a library installer/uninstaller module moves all libraries into a libraries database during software installation/startup in a computer operating system, and removes a library from the database during software removal/shutdown. The above step is carried out with manipulation of the preferred record structure below:

Process Name
Conflict/No-conflict
Library call name
Library index number in "Libraries database"

Among the above loaded libraries, there may exist some libraries that lead to software conflicts due to reason (2) described in the section of "Technical background". In the following steps, the method of the present invention will carry out a series of processing according to libraries recorded in the libraries database, thus avoiding occurrence or recurrence of software conflicts.

B. Prescanner Step

The prescanner step as a preferred embodiment is further divided into following substeps:

(a) recording dependency;

(b) obtaining a valid dependency tree by cropping dependency according to valid dependency (c) obtaining conflict information based on the valid dependency tree, according to whether the number of parameters of called functions matches that of calling functions, whether types of parameters of called functions match those of calling functions, or whether types of return values of called functions match those of calling functions.

As a preferred embodiment, the invention adopts the well-known data structure of "tree" and its "operations" (such as insertion, deletion, merge and traversal) to record dependency. In other words, the dependency tree is an example of the data structure of "tree", which records the dependency of binary executable code of executable files and libraries that the code may call and are recorded in the libraries database. Those skilled in the art should understand that the scope of the present invention is not limited by "tree" and covers other data structures that may implement such dependency, such as "graph", "list", their operations and so on. Those skilled in the art should also understand that the scope of the present invention is not limited by the preferred embodiment of the present invention carrying out prescan with preorder traversal and covers other traversal approach, such as "midorder" and "postorder", their operations and so on.

(a) Step of recording dependency

FIG. 1 shows the process of generating a dependency tree, where a tree node indicates an executable file or a library it calls, and a tree pointer indicates the dependency of a library indicated by a succeeding node on a library indicated by a preceding node. In the preferred embodiment, the node indicating the executable file of A.EXE is taken as root, indicated by A. As is well-known, the executable file of A.EXE contains a reference table which records library functions called by functions of the executable file of A.EXE, and for the preferred embodiment, they are function X1 of library B, function X2 of library C, and function X3 of library C. According to the above dependency, succeeding left and right nodes B and C are generated for root A, where B indicates library B and C indicates library C. Node A points to nodes B and C with left and right pointers respectively. The left and right pointers indicate the dependency of the executable file of A.EXE on libraries B and C respectively. Similarly, according to the content in the reference table of library B (i.e. library B calls function Y1 of library D, function Y2 of library D and function Y3 of library E), left and right succeeding nodes D and E are generated for node B, where D indicates library D and E indicates library E. The left and right pointers indicate the dependency of library B on libraries D and E respectively. Since reference tables of libraries C, D and E are empty, no succeeding nodes are generated for them. With the generation of the above tree, we will get the following result: the executable file of A.EXE (Node A) depends on libraries B and C (Nodes B and C) and library B (Node B) on libraries D and E (Nodes D and E).

Preferable, the code implementation for generation of the above dependency tree is as follows:

```
Function build_dependency_tree(object x) // x is executable of dll
Begin
    Read ref table of x
        For each element i in ref table do
            Begin
                Record (x,i,false) into tree db.
            Build_dependency_tree(i);
            end
End
```

Thus, the dependency tree is generated according to the binary code of executable files, which records dependency between the current executable file and libraries, as well as between libraries. However, the above dependency establishment is based only on name matching between caller and callee in reference tables of executable files or libraries, which by itself is not sufficient to avoid software conflicts due to reason (2) in the section of "Technical background". Thus it is necessary to make needed choice on the above dependency in order to further delete those dependencies that may lead to software conflicts. In other words, it is necessary to perform steps (b) and (c) below. Step (b) as optional generates a valid dependency tree by cropping, and further reduces the number of traversals in step (c), thus improving efficiency.

(b) Step of cropping dependencies according to valid dependencies to generate a valid dependency tree First is given a definition of valid dependency. Suppose that entity 1 depends on entity 2 while entity 2 depends on entity 3. If there exists a function in entity 1 that calls a function in entity 3 by calling a function in entity 2, entity 2 is said to be valid dependent upon entity 3 with respect to entity 1, or not valid dependent if otherwise. For example, if a function in the executable code A of a program calls function X1 of a library B, while function X1 of library B calls function Y1 of a library D, library B is valid dependent upon library D with respect to program A. If there does not exist such a function in the executable code A that satisfies the above requirement, library B is not valid dependent upon library D with respect to program A.

Based on the above definition, if entity 1 is not valid dependent upon entity 3, software conflicts may occur, which is to be avoided by the present invention. As to the preferred embodiment of the present invention, lack of valid dependency corresponds to whether the library depended upon lacks the called function.

Figure 2A:
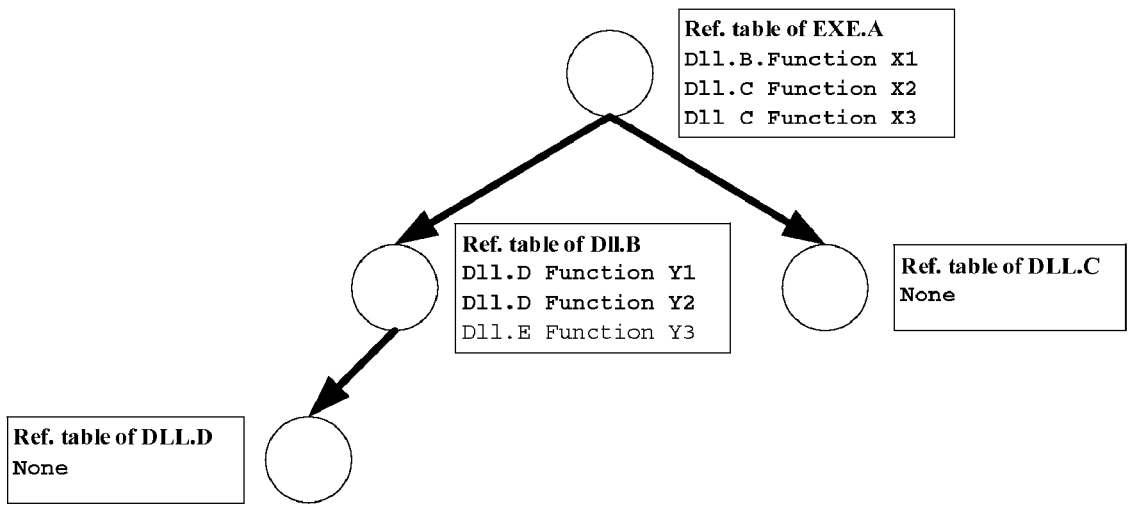
FIG. 2A shows a valid dependency tree after the dependency tree of FIG. 1 is cropped according to valid dependency.

FIG. 2A shows a valid dependency tree after the generated dependency tree is cropped according to valid dependency. In other words, valid dependency is determined according to whether the called library lacks the called function, and then nodes of invalid dependency in FIG. 1 will be cropped. The cropping process is as follows: first, node A is traversed and all code of executable file A.EXE indicated by node A is scanned to obtain all function names corresponding to all call instructions, which are function X1 of library B, function X2 of library C and function X3 of library C as to the preferred embodiment. Since the executable file A.EXE calls function X1 of library B, node A is validly dependent upon node B. Then node B is traversed and all code of library B indicated by node B is scanned to obtain functions in libraries D and E called by function X1 of library B called by the executable file A.EXE. It should be noted that although library B calls function Y1 of library D, function Y2 of library D and function Y3 of library E, functions in library B called by the executable file A.EXE, for example X1, do not necessarily call every one of these three functions, i.e. function X1 of library B may call one or two of them, and specific to the preferred embodiment, function X1 of library B calls function Y1 of library D and function Y2 of library D, but does not call function Y3 of library E. Then the traversal is down to node D. Since function X1 of library B called by the executable file A.EXE calls function Y1 of library D and function Y2 of library D, node A is valid dependent on node D. Then the traversal is down to node E. Since function X1 of library B called by the executable file A.EXE does not call function Y3 of library E, node A is not valid dependent on node E. Then the traversal is down to node C. Since the executable file A.EXE calls function X1 of library C and function X3 of library C, node A is valid dependent on node C. Finally, the above invalid dependency node E is cropped. With this a valid dependency tree shown by FIG. 2A is generated, where the executable file A.EXE (node A) depends on libraries B and C (nodes B and C) and library B (node B) depends on library D (node D).

Preferably, the above dependency of nodes is stored in the following form:

Dependency record: Node 1, Node 2, boolean, with the semantics of Node 1's dependency on Node 2 being selected by a variable of boolean. For example, node A's dependency on node B is recorded as: A, B, compatible while node A's independency from node B is recorded as: A, B, conflict, and the default record indicates independency.

Preferable, the code implementation for cropping process is as follows:

```
Initially,
x=Exe.a;
run build_valid_dependency (x);
Function build_valid_dependency_tree(object x) // x is a function
Begin
    Scan code in x;
    For each call/jump/long jump in code do
        Begin
            y=Function name corresponding to call instruction;
```

```
            xa=dll or exe file hosting x;
            ya= dll or exe file hosting y;
            modify record as (xa,ya,true);      //record xa's
    dependency on ya as true
    Build_valid_dependency_tree(y);
            end
    End
```

For the preferred embodiment, the following dependency records are generated: A,B, compatible; B,D, compatible; B,E, conflict; A,C compatible.

Since nodes of libraries which the executable code of program will not actually call, for example node E, are cropped in the valid dependency tree, operation on valid dependency tree, for example traversal, will be fastened compared with uncropped dependency tree, without affecting the accuracy of prescanning.

(c) Step of obtaining conflict information based on the valid dependency tree, according to whether the number of parameters of called functions matches that of calling functions/whether types of parameters of called functions match those of calling functions/whether types of return values of called functions match those of calling functions.

If any of the following situations arises, it is determined to be an invalid dependency: the number of parameters of called functions mismatches that of calling functions, types of parameters of called functions mismatch those of calling functions, or types of return values of called functions mismatch those of calling functions. According to the above definition, if there exists the above invalid dependency, software conflicts may occur, which are to avoided by the invention.

Figure 2B:
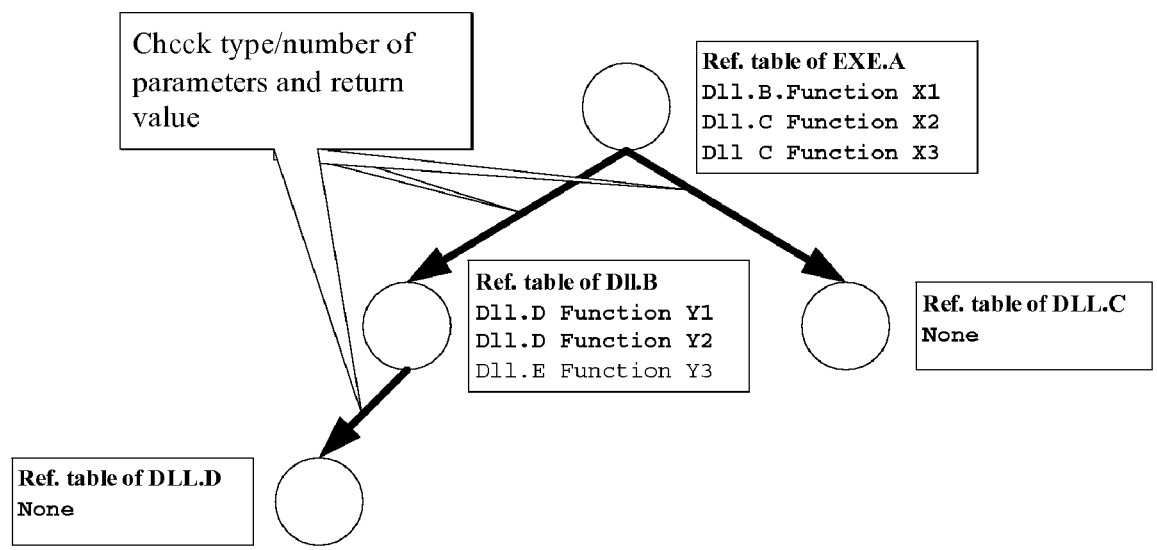
FIG. 2B shows a schematic graph of obtaining conflict information according to the dependency tree of FIG. 2A.

FIG. 2B shows obtaining conflict information by determining whether dependency exists, according to whether the number of parameters of called functions matches that of calling functions/whether types of parameters of called functions match those of calling functions/whether types of return values of called functions match those of calling functions. First, node A is traversed, and all code of the executable file A.EXE indicated by node A is scanned to scan parameter types/number/return value types of functions corresponding to all call instructions before calling, which are, as to the preferred embodiment, parameter types/number/return value types of function X1 of library B, function X2 of library C and function X3 of library C before calling. Then the traversal is down to node B, and to-be-passed parameter types/number/return value types of function X1 of library B, as well as parameter types/number/return value types of function Y1 of library D and function Y2 of library D called in library B before calling are scanned. Then the parameter types/number/return value types of function X1 of library B before calling are compared with the to-be-passed parameter types/number/return value types of function X1 of library B, respectively. If they are not matched, dependency record about nodes A and B is modified to form the conflict information. Then the traversal is down to node D, and to-be-passed parameter types/number/return value types of function Y1 of library D and function Y2 of library D are scanned. Then the parameter types/number/return value types of function Y1 of library D and function Y2 of library D called by library B before calling are compared with the to-be-passed parameter types/number/ return value types of function Y1 of library D and function Y2 of library D. If they are not matched, dependency record about nodes A and B is modified to form the conflict information. Then the traversal is down to node C, and to-be-passed parameter types/number/return value types of function X2 of library C and function X3 of library C are scanned. Then the parameter types/number/return value types of function X2 of library C and function X3 of library C before calling are compared with the to-be-passed parameter types/ number/return value types of function X2 of library C and function X3 of library C. If they are not matched, dependency record about nodes A and C is modified to form the conflict information.

For example, if it is concluded that the executable file A and library B matches, and library B and library D matches while the executable file A and library C mismatches with the above step (c) according to the criteria whether the number of parameters of called functions matches that of calling functions/whether types of parameters of called functions match those of calling functions/whether types of return values of called functions match those of calling functions, the current dependency record of (A,C, compatible) will be modified into (A,C, conflict).

Preferably, the code implementation for the above process is as follows:

```
begin
For each record(xa, ya, boolean) in tree db do
    Begin
        Set "xa compatible with ya"; // scan xa code
        For each call instruction in xa do
            Begin
                If (the function called belongs to ya) then
                    begin
                        call_context1= parameter
    types/number/return value type in xa before calling;
                        call_context2= to-be-passed
    parameter types/number/return value types of in corresponding ya
    function;
                        if call_context1!= call context2
    then
                            Begin
    Set "xa incompatible with ya";
                                    Jump out of for
    circle
                                end
                    end
            end
        end
    end
```

Figure 4A:
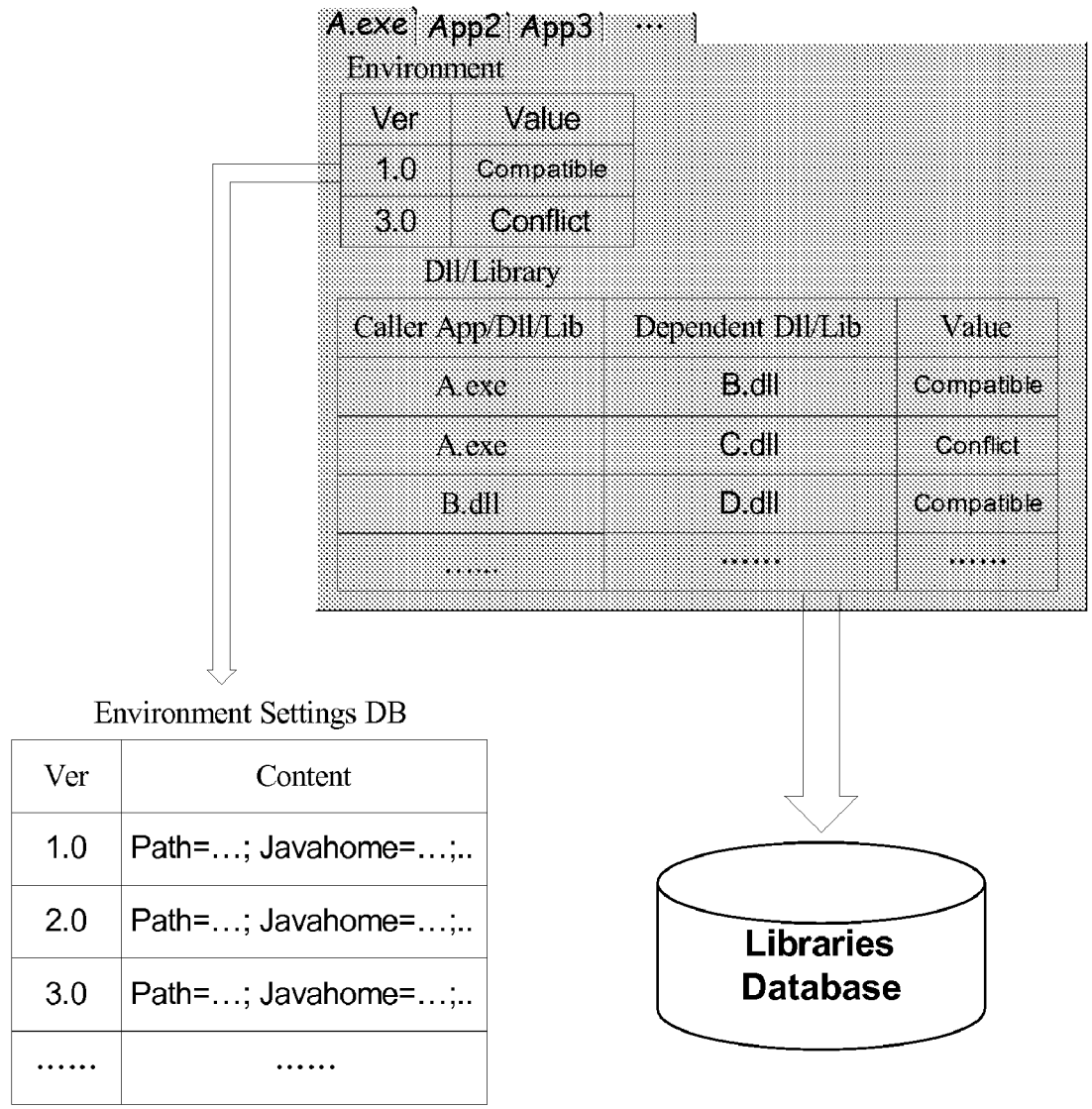
FIG. 4A shows the data structure of at least one piece of conflict information individually indicating at least one conflict, obtained by the prescanner step/module and stored by a conflict information knowledge storage module.

Preferably, the code implementation for modifying dependency record is as follows:

Delete record when boolean=false from tree db;

FIG. 4A shows the data structure of at least one piece of conflict information individually indicating at least one conflict, obtained by the prescanner step and stored by a conflict information knowledge storage module. It records the result of the above modification, i.e. program A and library B are compatible, program A and library C conflict, library B and library D are compatible. The date structure is preferably a "list". However, those skilled in the art may readily understand that other data structures may be used to record the above conflict information, for example "tree" and "graph".

Figure 3:
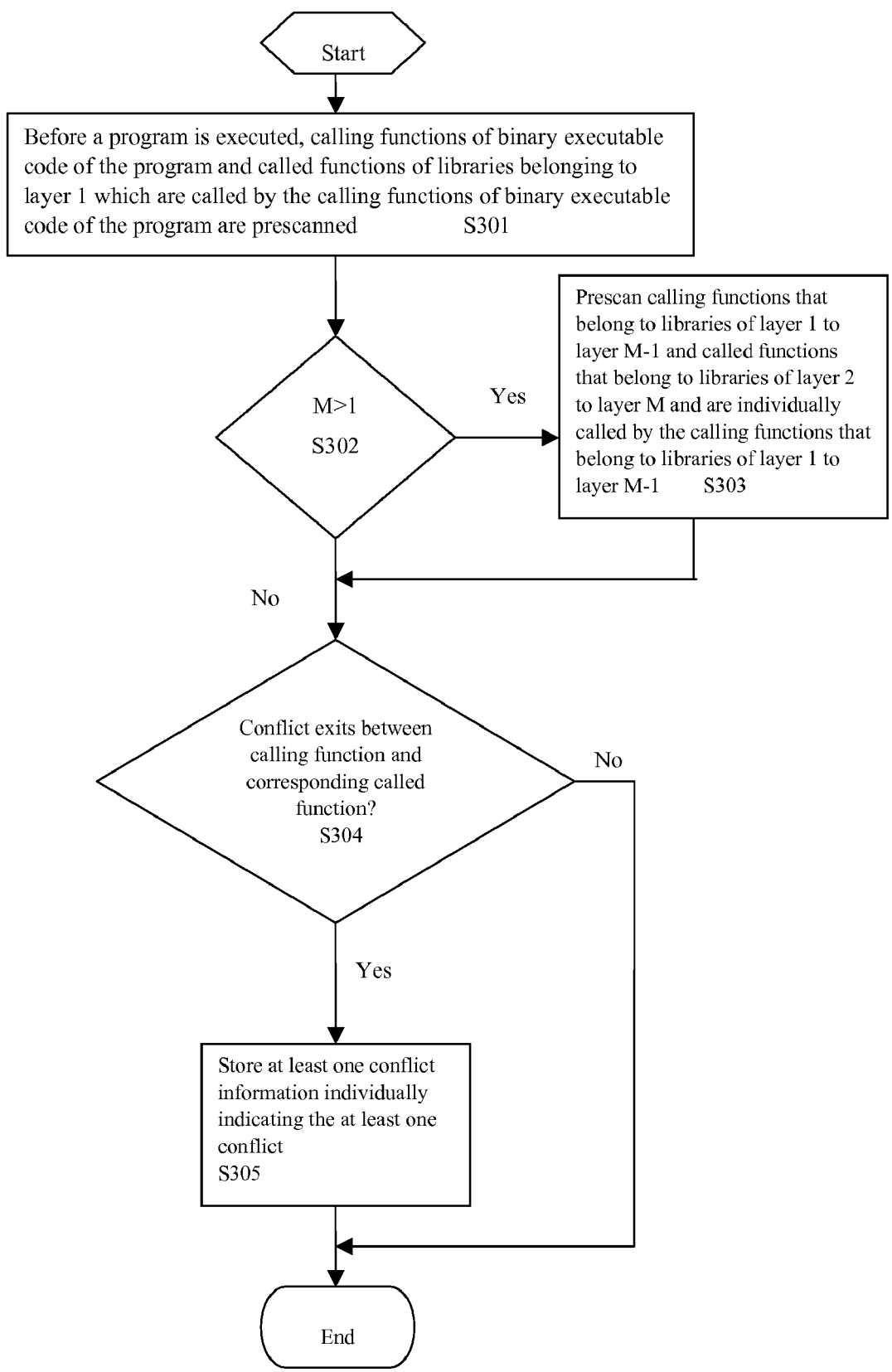
FIG. 3 shows a flowchart of prescanning according to a preferred embodiment of the present invention.

Here, libraries called by binary executable code of program are divided into M layers according to the order of calling, with each layer having at least one library and M≧1. For example, root A in FIG. 1 indicates the binary executable code of program A. According to the order of calling, libraries B and C indicated by nodes B and C are taken as layer 1, and libraries D and E indicated by nodes D and E are taken as layer 2. Program A calls libraries B and C at layer 1, and library B at layer 1 calls libraries D and E at layer 2. M=2. FIG. 3 shows the flowchart of prescan. At step S301, before a program is executed, calling functions of binary executable code of the program and called functions of libraries belonging to layer 1 which are called by the calling functions of binary executable code of the program are prescanned. For example, calling functions of program A and called function X1 of library B are prescanned. At step S302, it is determined whether M is larger than 1. If so, go to step S303, where calling functions of libraries belonging to lay 1 to layer M−1 and called functions of libraries belonging to layer 2 to layer M which are called by the calling functions of libraries belonging to lay 1 to layer M−1 are prescanned, for example, calling functions in library B and the called functions Y1 and Y2 of library D are prescanned, then go to step S304; if not, go directly to step S304. At step S304, it is determined whether there exists any conflict between the above calling functions and the corresponding called functions, for example, the number of parameters of called functions mismatches that of calling functions, types of parameters of called functions mismatch those of calling functions, or types of return values of called functions mismatch those of calling functions. Specifically, the conflict of calling functions and corresponding called functions is syntax mismatches. At step S305, if at least one conflict, at least one piece of conflict information at least indicating such a conflict is stored.

As a preferred embodiment, among M-layer libraries called by a program, only libraries which the program is validly dependent on are prescanned. Since the prescanner step prescans at least three types of syntax conflicts, it is more effective than method (1) of prior art which scans only versions. Since the prescanner step prescans all library functions, it saves effort and cost when compared with method (2) of prior art which scans only basic library functions. Since the prescanner step prescans all library functions, when compared with method (3) of prior art which adopts virtual machines, it brings out (I) improved computer performance; and (II) sharing of libraries with other applications.

C. Sniffer Step

Figure 5:
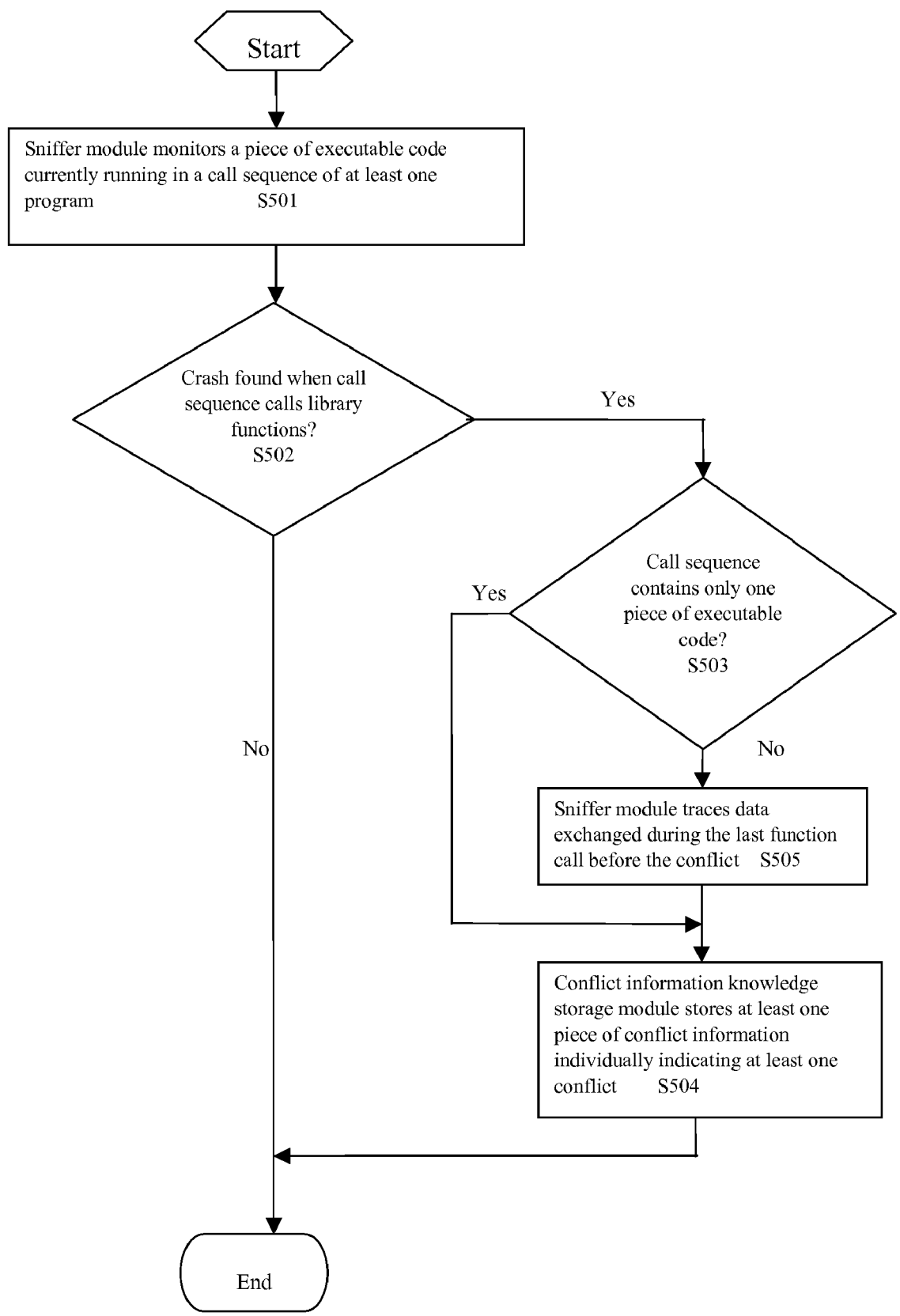
FIG. 5 shows the flowchart of the sniffer step according to another preferred embodiment of the present invention.

FIG. 5 shows the flowchart of the sniffer step. The sniffer step monitors the binary executable code of a program when the program runs, and records the call stack. If a process crashes, the sniffer step will try to locate the library that leads to the crash.

At step S501, a sniffer module monitors a piece of currently running executable code of call sequence of the program. The call sequence may include at least a piece of executable code because for example, there may exist such calling as program A->library B->library C->library B->program A->library C-> library D where "->" indicates a calling relation and multiple calls correspond to multiple pieces of executable code. The sniffer module may adopt a call stack monitor, which is a system monitor technique commonly used in system management software of the IBM Tivoli line. This technique determines whether an application is in a normal or an abnormal state by inspecting whether changes in stack before and after function calling in the application satisfy certain patterns. In the present invention, the code register or special instructions such as call and long/far jump are monitored to record all call/return actions while the call sequence calls library functions, data exchange between the running executable code and the executed library code while the call sequence calls library functions are monitored, and libraries in current use are found by inspecting the call stack.

Figure 6:
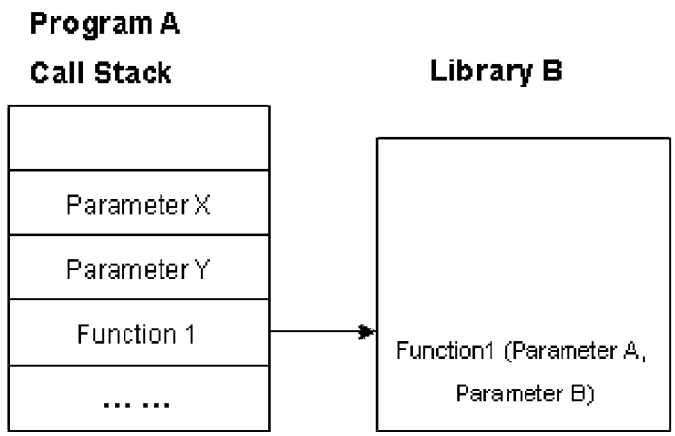
FIG. 6 shows the structure of a call stack.

FIG. 6 shows the structure of a call stack. For example, the call stack may record called function 1 of library B called by the calling function of executable code A, and parameters X and Y passed from A to B.

Figure 4B:
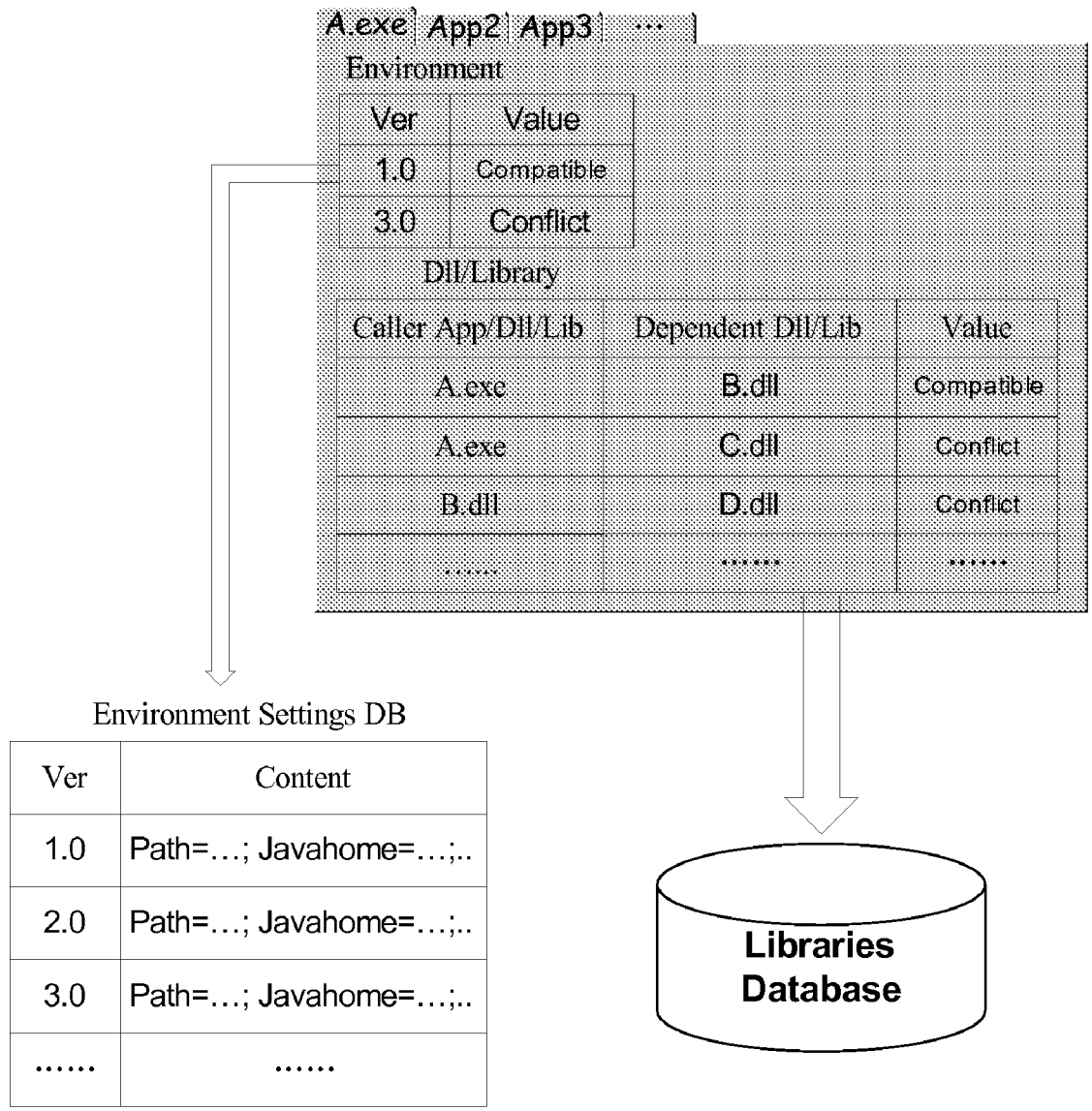
FIG. 4B shows the data structure of at least one piece of conflict information individually indicating at least one conflict, obtained by the sniffer step/module and stored by the conflict information knowledge storage step/module.

At step S502, it is determined whether the call sequence crashes when it calls library functions, for example whether error interrupt or exception occurs. If not so, no action will be taken. Otherwise at step S305, the sniffer module determines information on the current process, for example, the information on the current process includes whether the call sequence contains only one or multiple pieces of executable code. If the call sequence contains only one piece of executable code, at step S504, the step of conflict information storage is taken. Otherwise, at step S505, the sniffer module traces the data exchanged during the last function call before the conflict, so as to extract the last piece of executable code leading to the conflict and find libraries that have ever manipulated the data, then proceeds to step S504 to carry out the step of conflict information storage. For example, crash occurs when function X1 of library B calls function Y1 of library D, then information about conflict of library B and library D is stored. Step 504 may store conflict information in the manner of modifying existing dependency, for example, the dependency record generated during the step of prescan, or in the manner of modifying dependency generated by the sniffer step itself. As a preferred embodiment, the former manner is taken. In other words, on the basis of dependency shown in FIG. 4A, the record (B,D compatible) is modified into (B,D conflict). FIG. 4B shows the data structure of at least one piece of conflict information individually indicating at least one conflict, obtained by the sniffer step and stored by the conflict information knowledge storage step.

The code implementation of step S501 to S505 is as follows:

```
Begin
    Read current TC (thread context) information
    Read call stack entrance of current TC
    Set ADDR=the latest address pushed in stack
    Set ya = the library which ADDR belongs to
Query xa = the initiator which call ya from dependency_tree (database).
Record (xa incompatible with ya)
End
```

Since the sniffer step locates the library leading to crash, it is more effective than method (1) of prior art which scans only versions. Since the sniffer step monitors all library functions leading to crash, it saves effort and cost when compared with method (2) of prior art which scans only basic library functions. Since the calling sequence monitored by the sniffer step therein at least includes a piece of executable code, when compared with method (3) of prior art which adopts virtual machines, it brings out (I) improved computer performance and (II) sharing of libraries with other applications.

D. Step of Avoiding Software Conflict

As is well known, library loader module is usually a hook application which hooks all dll loader applications and file open library, such as Loadlibrary( ) and CreatFile( ). When the program is executed, i.e. its executable binary code is executed, and when the above case occurs that calling functions call corresponding called functions in the call sequence of the program, the library loader will abandon loading a library if conflict information corresponding to the library has been stored in the conflict information knowledge storage module. Otherwise, the library loader loads the library. When running the executable code of program A, there may exist such as case where the call sequence of executed program A includes program A calling function X1 of library B, and function X1 of library B calling function Y1 of library D. According to dependency records, program A and library B are compatible while library B and library D conflict. Thus, the call sequence of program A loads library B through Loadlibrary( ), but abandons loading library D.

Preferably, if the loaded library is new, when there exist at least one such libraries, the library loader module will choose the library randomly. Otherwise, when there exists in the conflict information knowledge storage module a record of no-conflict between the call sequence and the library, the library loader module will load the library into the process space. Otherwise, it will abandon loading the library into the process space. A display unit will prompt user whether to close the process of the call sequence leading to the conflict.

As to the above approach (3), by combining the above prescanner step and sniffer step, the following effect will be brought about: it not only prevents software conflicts before a program runs through the prescanner step, but also monitors and records libraries that have passed the prescanning but lead to software conflicts during the actual calling, further preventing the libraries that have passed the prescanning but lead to software conflicts from causing software conflicts during the next call. Moreover, it is more effective than method (1) of prior art which scans only versions. Since the prescanner and sniffer steps examine all library functions, it saves effort and cost when compared with method (2) of prior art which scans only basic library functions. Since the prescanner and sniffer steps examine all library functions, when compared with method (3) of prior art which adopts virtual machines, it brings out (I) improved computer performance and (II) sharing of libraries with other applications.

II. System for Avoiding Software Conflicts

Figure 7:
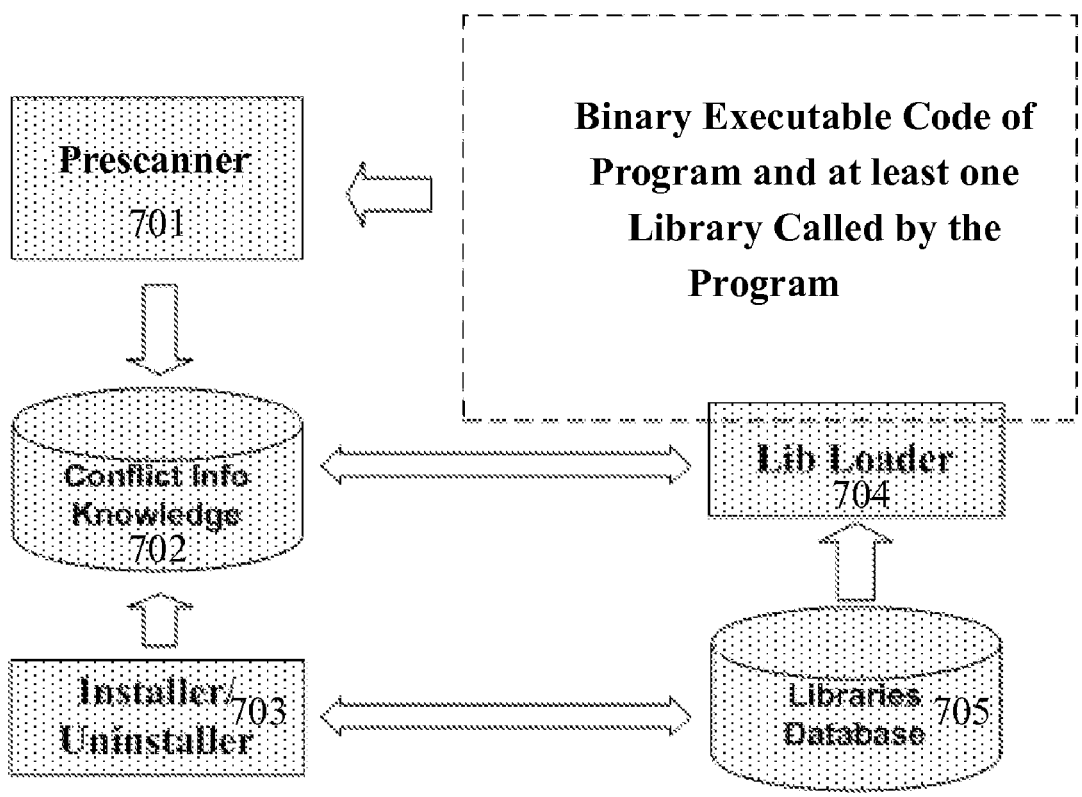
FIG. 7 shows the system architecture of a prescanner module according to a preferred embodiment of the present invention.

FIG. 7 shows a system architecture according to a preferred embodiment of the present invention. According to the function of avoiding software conflicts, the system is analyzed into a prescanner module 701, a conflict information knowledge storage module 702, a library installer/uninstaller module 703, a library loader module 704, and a libraries database 705, wherein every module of the system for avoiding software conflict described in section II corresponds to a step of the method for avoiding software conflict described in section I, so the above modules will be described by combining sections I and II.

The library installer/uninstaller module 703 carries out the library installer/uninstaller step with a target of the libraries database 705. In the libraries database 705 are stored all libraries in the current computer.

Its preferred record structure is as follows:
Process Name
Conflict/no-conflict
Library call name
Library index number in "Libraries database"

According to the prescanner step, the prescanner module 701 will carry out a series of prescan on the binary executable code of the program and libraries recorded in the libraries database 705 as called by the binary executable code of the program, and the conflict information knowledge storage module 702 stores a data structure of at least one piece of information indicating at least one conflict. Then according to the step of avoiding software conflicts, if the conflict information knowledge storage module 702 has stored therein conflict information corresponding to the library, the library loader module 704 will abandon loading the library. Otherwise, the library loader module 704 will load the library.

Figure 8:
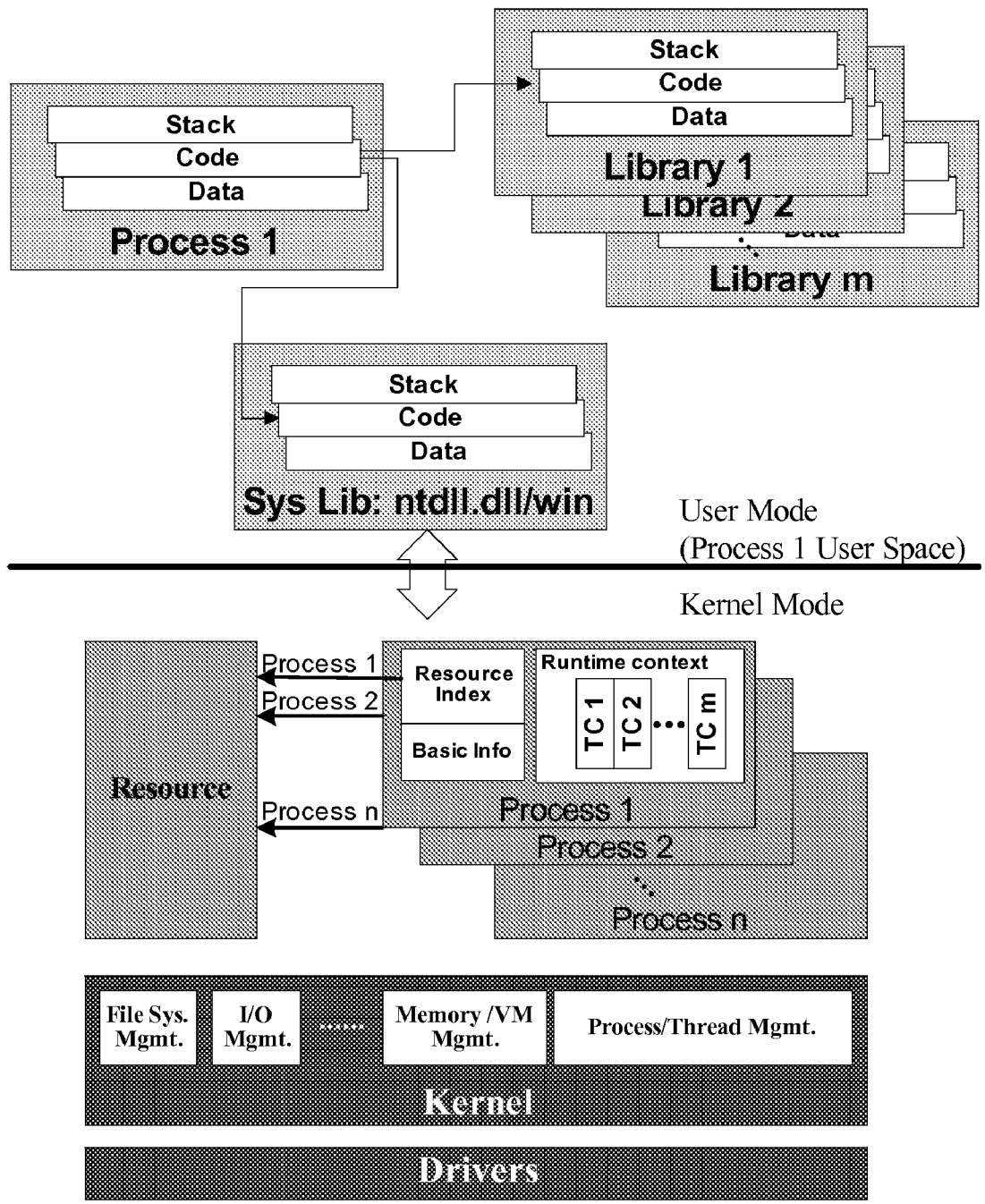
FIG. 8 shows a memory image of a process in a operating system according to the present invention.

FIG. 8 shows a memory image of a process in the operating system according to the present invention. A process may load several libraries in its space. From the user mode (user space of process 1) can be seen multiple libraries 1, 2, ... m and system library ntdll.dll/win that are loaded by the library loader module 704 and have no conflict with process 1. It can be seen from the kernel mode that libraries 1, 2, ... m call library functions according to address or name space. Preferably, the system library must be loaded into a fixed address and act as a bridge for the process to use kernel sources, such as system call, interrupt, and so on. In Windows, the system library is ntdll.dll, which links to kernel and Windows environment (including kernel32.dll, user32.dll, advapi32.dll, gdi32.dll and so on).

Figure 9:
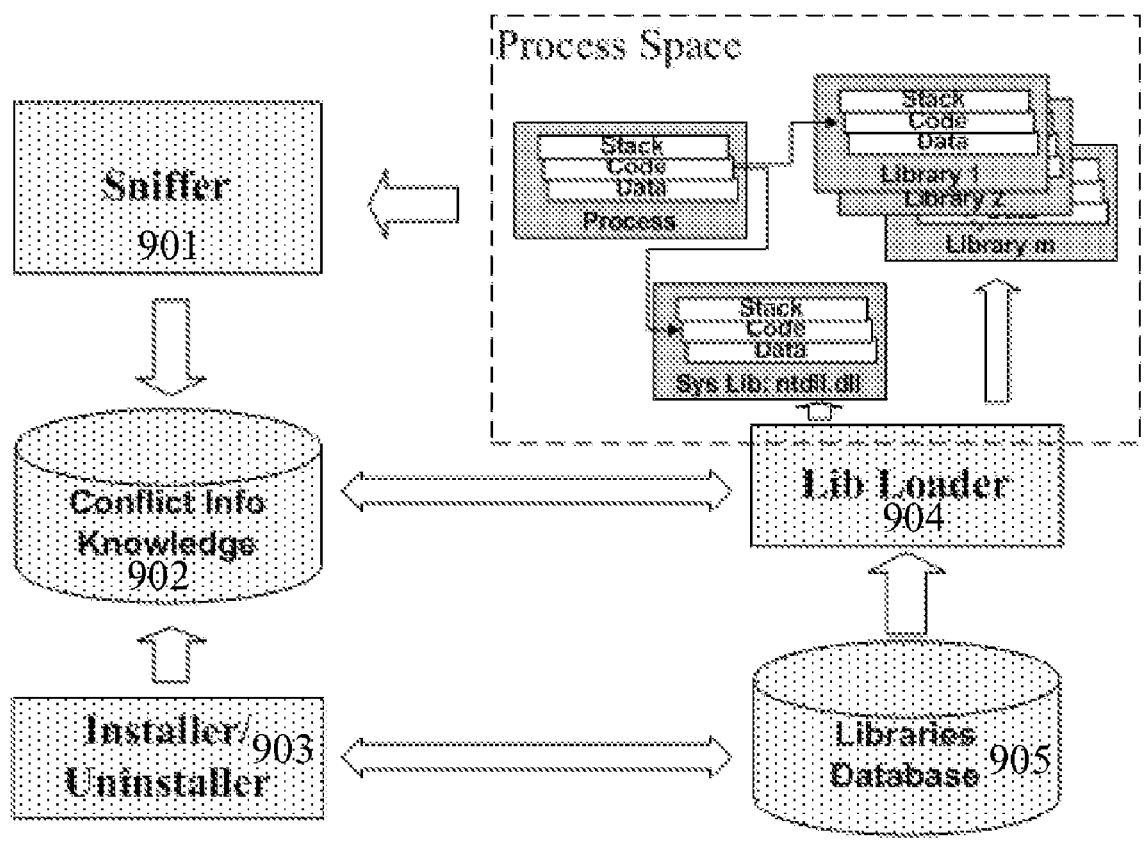
FIG. 9 shows the system architecture of a sniffer module according to another preferred embodiment of the present invention.

FIG. 9 shows a system architecture according to another preferred embodiment of the present invention. According to the function of avoiding software conflicts, the system is analyzed into a sniffer module 901, a conflict information knowledge storage module 902, a library installer/uninstaller module 903, a library loader module 904, and a libraries database 905, wherein the conflict information knowledge storage module 902, library installer/uninstaller module 903, library loader module 904 and libraries database 905 are identical to the conflict information knowledge storage module 702, library installer/uninstaller module 703, library loader module 704 and libraries database 705 in FIG. 7. For simplicity, only the part different from FIG. 7, i.e. the sniffer module 901, the will be described below.

According to the above sniffer step, the sniffer module 901 monitors the binary executable code of a program when the program is running, and records the call stack. If the process crashes, the sniffer module 901 will try to locate the library leading to the crash.

The sniffer module adopts a call stack monitor, which is a system monitor technique commonly used in system management software of the IBM Tivoli line. This technique determines whether an application is in a normal or an abnormal state by inspecting whether changes in stack before and after function calling in the application satisfy certain patterns. In the present invention, the code register or special instructions such as call and long/far jump are monitored to record all call/return actions while the call sequence calls library functions, data exchange between the running executable code and the executed library code while the call sequence calls library functions are monitored, and libraries in current use are found by inspecting the call stack.

If it is found that the call sequence crashes when it calls library functions, for example when error interrupt or exception occurs, at a subsequent step, the sniffer module 901 stores conflict information about the crash in the conflict information knowledge storage module 902. Preferably, the sniffer module 901 determines information on the current process, for example, the information on the current process includes whether the call sequence contains only one or multiple pieces of executable code. If the call sequence contains only one piece of executable code, the conflict information is stored in the conflict information knowledge storage module 902. Otherwise, the sniffer module 901 traces the data exchanged during the last function call before the conflict, so as to extract the last piece of executable code leading to the conflict and find libraries that have ever manipulated the data, then stores the conflict information in the conflict information knowledge storage module 902.

Since the sniffer module 901 locates the library leading to crash, it is more effective than method (1) of prior art which scans only versions. Since the sniffer module 901 monitors all library functions leading to crash, it saves effort and cost when compared with method (2) of prior art which scans only basic library functions. Since the calling sequence monitored by the sniffer module 901 at least includes a piece of executable code, when compared with method (3) of prior art which adopts virtual machines, it brings out (I) improved computer performance and (II) sharing of libraries with other applications.

Preferably, the prescanner module 701 and the sniffer module 901 may be combined into one module to carry out the prescan and sniffing altogether.

While the preferred embodiment of the present invention has been described with respect to a hardware structure or method steps in the above, the operation method of the system according to the present invention can be implemented as computer program software. For example, the method according to an exemplary embodiment of the present invention can be embodied as a computer program product, which enables a computer to execute one or more exemplified methods. The computer program product may comprise computer readable medium containing computer program logic or codes thereon for enabling the computer system to execute one or more exemplified methods.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for avoiding software conflicts when a program calls at least one library, said at least one library being divided into layer 1 to layer M according to dependency among the at least one library, with each layer containing at least one library and M≧1, said method comprising:
performing a library installer step comprising:
moving all libraries to a libraries database to install the software;
according to a reference table of the program and reference tables of libraries he program calls, determining M layers of libraries involved in the calling by the binary executable code of the program, and determining dependency among the program and the M layers;
recording in a tree dependency between the program and at least one library the program calls;

(a) before the program runs, prescanning calling functions of the binary executable code of the program and called functions that belong to libraries of layer 1 and are individually called by the calling functions of the binary executable code of the program, and if M>1, further prescanning calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions, wherein among the M layers called by the binary executable code of the program, prescanning only those libraries that the program is validly dependent upon, wherein the conflict between calling functions and corresponding called functions includes syntax mismatches, the syntax including at least one of: the number of parameters of calling functions and that of called functions, types of parameters of calling functions and that of called functions, and types of return values of calling functions and that of called functions, and wherein the prescanning is carried out through a traversal of the tree;
(b) if there exists at least one conflict, storing at least one piece of conflict information individually indicating the at least one conflict; and
executing said program, wherein executing comprises:
loading libraries from the libraries database;
(c) when there appears that the calling function calls the corresponding called function in a call sequence of the program in execution, abandoning loading of the library containing the called function if the conflict information indicating that the call conflicts has been stored, or loading the library containing the called function otherwise;
prompting a user whether to close a process containing the call sequence leading to the conflict;
(d) when running the binary executable code of the program, monitoring a piece of executable code currently running in a call sequence of the binary executable code of the program, the call sequence including at least one piece of executable code, wherein step (d) further comprises:
monitoring a code register or special instructions so as to record all call/return actions when the call sequence calls functions of the libraries, the special instructions being calls or long/far jumps, wherein a call stack monitor module is used to carry out the monitoring, and wherein the call stack monitor module locates the library currently used by inspecting a call stack, and monitoring data exchange between the executable code and the library code executed when the call sequence calls functions of the libraries;
(e) if it is found that the call sequence crashes when the call sequence calls functions of a given library, storing conflict information on the crash, wherein step (e) further comprises:
if the call sequence includes only one piece of executable code, carrying out the step of storing confliction information, and
otherwise, tracing data exchanged during the last function call before the conflict, so as to extract the last piece of executable code of the call sequence leading to the conflict and find the libraries that have ever manipulated the data, and then carrying out the step of storing confliction information; and
(f) when the call sequence calls a function of the given library again, abandoning loading the given library if conflict information corresponding to the given library has been stored, or loading the given library otherwise.

2. A method for avoiding software conflicts when a program calls at least one library, said at least one library being divided into layer 1 to layer M according to dependency among the at least one library, with each layer containing at least one library and M≧1, said method comprising:

performing a library installer step comprising:

moving all libraries to a libraries database to install the software;

(a) before the program runs, prescanning calling functions of the binary executable code of the program and called functions that belong to libraries of layer 1 and are individually called by the calling functions of the binary executable code of the program, and if M>1 further prescanning calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions;

(b) if there exists at least one conflict, storing at least one piece of conflict information individually indicating the at least one conflict; and executing said program, wherein executing comprises:

(c) when there appears that the calling function calls the corresponding called function in a call sequence of the program in execution, abandoning loading of the library containing the called function if the conflict information indicating that the call conflicts has been stored, or loading the library otherwise;

(d) when running the binary executable code of the program, monitoring a piece of executable code currently running in a call sequence of the binary executable code of the program;

(e) if it is found that the call sequence crashes when the call sequence calls functions of a library, storing conflict information on the crash; and (f) when the call sequence calls a function of the library again, abandoning loading the library if conflict information corresponding to the library has been stored, or loading the library otherwise.

3. The method for avoiding software conflicts according to claim 2, further comprising, according to a reference table of the program and reference tables of libraries the program calls:

determining M layers of libraries involved in the calling by the binary executable code of the program; and determining dependency among the program and the M layers.

4. The method for avoiding software conflicts according to claim 3, wherein step (a) further comprises:

among the M layers called by the binary executable code of the program, prescanning only those libraries that the program is validly dependent upon.

5. The method for avoiding software conflicts according to claim 4, wherein the conflict between calling functions and corresponding called functions includes syntax mismatches.

6. The method for avoiding software conflicts according to claim 5, wherein the syntax includes at least one of:

the number of parameters of calling functions and that of called functions;

types of parameters of calling functions and that of called functions; and types of return values of calling functions and that of called functions.

7. The method for avoiding software conflicts according to claim 2, wherein dependency between the program and at least one library the program calls is recorded in the tree, and the prescanning is carried out through a traversal of the tree.

8. The method for avoiding software conflicts according to claim 2, wherein the call sequence includes at least one piece of executable code.

9. The method for avoiding software conflicts according to claim 2, wherein step (d) further comprises monitoring a code register or special instructions so as to record all call/return actions when the call sequence calls functions of the libraries.

10. The method for avoiding software conflicts according to claim 9, wherein the special instructions are call or long/far jump.

11. The method for avoiding software conflicts according to claim 9, wherein step (d) further comprises monitoring data exchange between the executable code and the library code executed when the call sequence calls functions of the libraries.

12. The method for avoiding software conflicts according to claim 9, wherein a call stack monitor module is used to carry out the monitoring.

13. The method for avoiding software conflicts according to claim 12, wherein the call stack monitor module locates the library currently used by inspecting a call stack.

14. The method for avoiding software conflicts according to claim 2, wherein before step (d) further comprises:

moving all libraries to a libraries database when installing the software; and removing the libraries from the libraries database when uninstalling the software.

15. The method for avoiding software conflicts according to claim 14, further comprising loading libraries from the libraries database.

16. The method for avoiding software conflicts according to claim 11, wherein step (e) further comprises:

if the call sequence includes only one piece of executable code, carrying out the step of storing confliction information; and otherwise, tracing data exchanged during the last function call before the conflict, so as to extract the last piece of executable code of the call sequence leading to the conflict and find the libraries that have ever manipulated the data, and then carrying out the step of storing confliction information.

17. The method for avoiding software conflicts according to claim 15, further comprising a display unit prompting the user whether to close the process containing the call sequence leading to the conflict.

18. The method for avoiding software conflicts according to claim 15, wherein:

if the called library is new, the library loader module randomly chooses one of at least one library if the at least one library exists; and otherwise, if a record of no-conflict about the call sequence and the library has been stored in the conflict information knowledge storage module, the library loader module loads the library into the process space; otherwise abandons loading the library into the process space.

19. A computer program product comprising non-transitory computer readable storage medium having computer readable program code embodied thereon, the computer readable program code configured to enable a computer system to execute the steps in a method according to claim 2.

20. A system for avoiding software conflicts when a program calls at least one library, said at least one library being divided into M layers according to the calling order, with each layer containing at least one library and M≧1, said system comprising:
- a prescanner module for, before the program runs, prescanning calling functions of the binary executable code of the program and called functions that belong to libraries of layer 1 and are individually called by the calling functions of the binary executable code of the program, and if M>1, further prescanning calling functions that belong to libraries of layer 1 to layer M−1 and called functions that belong to libraries of layer 2 to layer M and are individually called by the calling functions that belong to libraries of layer 1 to layer M−1, so as to determine whether there exists any individual conflict between the calling functions and the corresponding called functions;
- a conflict information knowledge storage module for, if there exists at least one conflict, storing at least one piece of conflict information individually indicating the at least one conflict;
- a library loader module for, when there appears that the calling function calls the corresponding called function in a call sequence of the program in execution, abandoning loading of the library containing the called function if the conflict information indicating that the call conflicts has been stored, or loading the library otherwise;
- a computer processor for executing said binary code;
- a sniffer module for monitoring a piece of executable code currently running in a call sequence of at least one program;
- a conflict information knowledge storage module for, if it is found that the call sequence crashes when the call sequence calls functions of a library, storing conflict information on the crash; and
- a library loader module for, when the call sequence calls a function of the library again, abandoning loading the library if conflict information corresponding to the library has been stored in the conflict information knowledge storage module, or loading the library otherwise.

21. The system for avoiding software conflicts according to claim 20, wherein according to a reference table of the program and reference tables of libraries the program calls, the following are determined:
- M layers of libraries involved in the calling by the binary executable code of the program; and
- dependency among the program and the M layers.

22. The system for avoiding software conflicts according to claim 12, wherein among the M layers called by the binary executable code of the program, only those libraries that the program is validly dependent upon are prescanned.

23. The system for avoiding software conflicts according to claim 22, wherein the conflict between calling functions and corresponding called functions includes syntax mismatches.

24. The system for avoiding software conflicts according to claim 23, wherein the syntax is at least one of:
- the number of parameters of calling functions and that of called functions;
- types of parameters of calling functions and that of called functions; and
- types of return values of calling functions and that of called functions.

25. The system for avoiding software conflicts according to claim 24, wherein dependency between the program and at least one library the program calls is recorded in a tree, and the prescanning is carried out through a traversal of the tree.

26. The system for avoiding software conflicts according to claim 20, wherein the call sequence includes at least one piece of executable code.

27. The system for avoiding software conflicts according to claim 20, wherein the sniffer module further monitors a code register or special instructions so as to record all call/return actions when the call sequence calls functions of the libraries.

28. The system for avoiding software conflicts according to claim 27, wherein the special instructions are call or long/far jump.

29. The system for avoiding software conflicts according to claim 27, wherein the sniffer module further monitors data exchange between the executable code and the library code executed when the call sequence calls functions of the libraries.

30. The system for avoiding software conflicts according to claim 27, wherein the sniffer module adopts a call stack monitor module.

31. The system for avoiding software conflicts according to claim 27, wherein the call stack monitor module locates the library currently used by inspecting a call stack.

32. The system for avoiding software conflicts according to claim 20, further comprising an installer/uninstaller module for, before the sniffing, moving all libraries to a libraries database when installing a software, and removing the libraries from the libraries database when uninstalling a software.

33. The system for avoiding software conflicts according to claim 32, wherein the library loader module is configured to load libraries from the libraries database.

34. The system for avoiding software conflicts according to claim 29, wherein:
- if the call sequence includes only one piece of executable code, the conflict information knowledge storage module stores the confliction information; and
- otherwise, the sniffer module traces data exchanged during the last function call before the conflict, so as to extract the last piece of executable code of the call sequence leading to the conflict and find the libraries that have ever manipulated the data, and then the conflict information knowledge storage module stores the confliction information.

35. The system for avoiding software conflicts according to claim 33, further comprising a display unit for prompting the user whether to close the process containing the call sequence leading to the conflict.

36. The system for avoiding software conflicts according to claim 33, wherein:
- if the called library is new, the library loader module randomly chooses one of at least one library if the at least one library exists; and
- otherwise, if a record of no-conflict about the call sequence and the library has been stored in the conflict information knowledge storage module, the library loader module loads the library into the process space; otherwise the library loader module abandons loading the library into the process space.

* * * * *